(12) United States Patent
Shafiee

(10) Patent No.: US 9,118,431 B2
(45) Date of Patent: *Aug. 25, 2015

(54) VIDEO SERVICE MANAGER

(75) Inventor: Mohammad Reza Shafiee, Ridgefield, CT (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/300,753

(22) Filed: Nov. 21, 2011

(65) Prior Publication Data

US 2013/0132581 A1  May 23, 2013

(51) Int. Cl.

| | |
|---|---|
| G06F 15/173 | (2006.01) |
| H04H 60/04 | (2008.01) |
| H04L 12/24 | (2006.01) |
| H04N 21/61 | (2011.01) |
| H04N 21/6405 | (2011.01) |
| G06Q 10/06 | (2012.01) |
| G06Q 10/10 | (2012.01) |
| G06Q 30/02 | (2012.01) |

(52) U.S. Cl.
CPC ............... *H04H 60/04* (2013.01); *G06Q 10/06* (2013.01); *G06Q 10/101* (2013.01); *G06Q 30/02* (2013.01); *H04L 41/5054* (2013.01); *H04N 21/6125* (2013.01); *H04N 21/6405* (2013.01)

(58) Field of Classification Search
CPC ..... H04L 5/003; H04L 5/0032; H04L 5/0033; H04L 5/0035; H04L 5/0094; H04L 5/0069
USPC .......................... 709/226, 212, 213, 223, 224
See application file for complete search history.

(56) References Cited

U.S. PATENT DOCUMENTS

| | | | | |
|---|---|---|---|---|
| 7,372,599 | B2 * | 5/2008 | Namizuka et al. | 358/2.1 |
| 7,373,549 | B2 * | 5/2008 | Malpani et al. | 714/17 |
| 8,209,514 | B2 * | 6/2012 | Kisel et al. | 711/173 |
| 2005/0074017 | A1 * | 4/2005 | Qian et al. | 370/401 |
| 2005/0089035 | A1 * | 4/2005 | Klemets et al. | 370/390 |
| 2007/0016825 | A1 * | 1/2007 | Tarcea et al. | 714/6 |
| 2008/0013613 | A1 * | 1/2008 | Ahmad et al. | 375/224 |
| 2012/0051440 | A1 * | 3/2012 | Parfenov et al. | 375/240.26 |
| 2013/0111491 | A1 * | 5/2013 | Glew et al. | 718/104 |
| 2013/0159399 | A1 * | 6/2013 | Torr | 709/203 |

* cited by examiner

*Primary Examiner* — Lan-Dai T Truong

(57) ABSTRACT

A method may include receiving a first order associated with processing a media file and estimating resources associated with fulfilling the first order. The method may also include generating a first logical circuit representing network elements to fulfill the first order and connections between the network elements. The method may further include allocating resources based on the first logical circuit and executing the order using the allocated resources.

20 Claims, 8 Drawing Sheets

VIDEO SERVICE MANAGER

BACKGROUND INFORMATION

Consumer demand for media is increasing. For example, consumers often watch and/or listen to various media at home, while traveling, at work, etc. As a result, the number of communication channels for delivering media content and the number of different types of devices for playing the content has also increased.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to an infrastructure for processing media from a head end through various network elements, in accordance with customer orders. The network elements may include, for example, transcoders, encryptors, ad splicers, etc., that are involved in processing the media. The infrastructure may dynamically evaluate the customer's request and generate processing paths or logical flows/circuits through the network elements that allow orders having various processing complexities to be processed in accordance with the customer's order.

Figure 1:
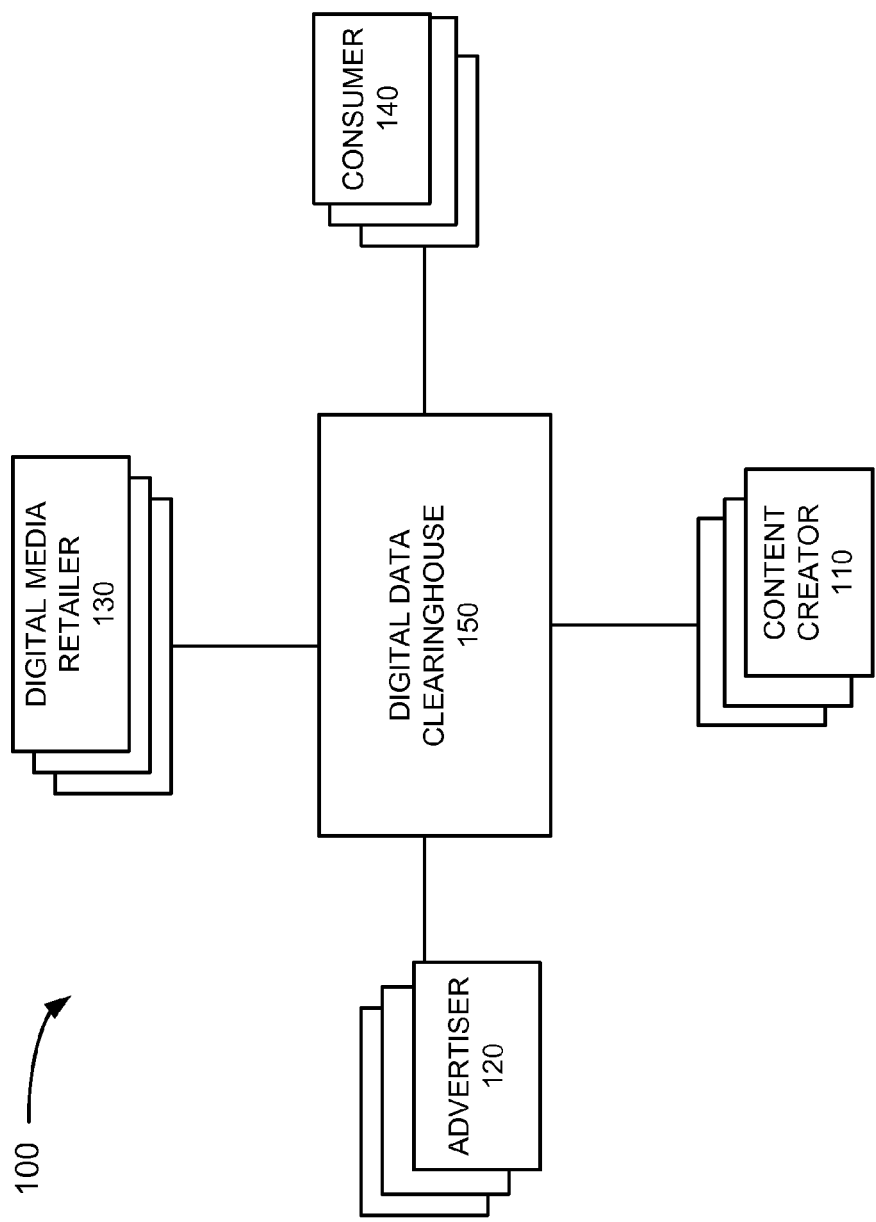
FIG. 1 schematically illustrates an exemplary network in which systems and methods described herein may be implemented.

FIG. 1 is a block diagram of an exemplary network in which systems and methods described herein may be implemented. Referring to FIG. 1, network 100 includes one or more content creators 110, one or more advertisers 120, one or more digital media retailers (DMRs) 130, one or more consumers 140 and digital data clearinghouse (DDC) 150. The exemplary configuration illustrated in FIG. 1 is provided for simplicity. It should be understood that a typical network may include more or fewer devices than illustrated in FIG. 1.

Content creator 110 (referred to collectively as content creators 110 or individually as content creator 110) may represent one or more creators of content that wish to package and/or distribute the content to other parties, such as consumers 140. For example, content creators 110 may include movie or television studios, music companies, publishers, game developers, parties who generate user generated content (UGC), websites, blogsites, etc. Content creators 110 may provide content to DDC 150 for transcoding, packaging and/or distribution, as described in detail below. The term "content," as used herein, may include any type of media, such as video, audio, multi-media, textual data, etc. The term "content" may also be referred to herein as "video assets" or "assets."

Advertiser 120 (referred to collectively as advertisers 120 or individually as advertiser 120) may represent one or more parties that wish to insert advertising into media files. For example, advertiser 120 may contract with a content creator 110 and/or digital media retailer 130 to insert an advertisement into a media stream provided to consumers 140. DDC 150 may insert the advertisement into the stream in accordance with the agreement between the parties.

DMR 130 may represent one or more business entities that receive media content from various parties and resell it to end users. For example, DMRs 130 may include broadcasters, cable companies, direct broadcast satellite (DBS) providers, Internet protocol television (IPTV) providers, mobile phone TV providers, online retailers, etc. DMRs 130 may receive media content from DDC 150 and sell/provide the content to consumers 140.

Consumer 140 may represent one or more consumers 140 that receive content originally generated by or provided by content creators 110 and that has been processed by DDC 150. For example, DDC 150 may format and package content for distribution by DMRs 130 and/or DDC 150 to consumers 140.

DDC 150 may include a server/computing device or a set of servers/computing devices associated with, for example, processing media content. For example, as described briefly above, DDC 150, also referred to herein as DDC platform 150, may provide an automated environment in which content from content creators 110 is transformed and packaged for distribution in any number of formats, based on the particular requirements associated with DMRs 130. In an exemplary implementation, DDC 150 may also aggregate various data and insert advertisements into the media content. DDC 150, consistent with implementations described herein, may also utilize flexible workflows to streamline the formatting and packaging of content for digital distribution.

As described above, the exemplary configuration illustrated in FIG. 1 is provided for simplicity. It should be understood that a typical network may include more or fewer devices than illustrated in FIG. 1. For example, it should be understood that network 100 may include a large number (e.g., hundreds or thousands) of different types of user devices associated with consumers 140, such as televisions, cellular telephones, personal computers (PCs), laptop computers, tablet computers, notebook computers, netbook computers, personal digital assistants (PDAs), etc.

It should also be understood network 100 may include one or more wired, wireless and/or optical networks (not shown) that interconnect the components illustrated in FIG. 1 and enable the components in FIG. 1 to communicate with one another. For example, network 100 may include one or more public switched telephone networks (PSTNs) or other type of switched network. Network 100 may also include one or more wireless networks and may include a number of transmission towers for receiving wireless signals and forwarding the wireless signals toward the intended destination. Network 100 may further include one or more satellite networks, one or more packet switched networks, such as an Internet protocol (IP) based network, a local area network (LAN), a wide area network (WAN), an intranet, the Internet, or another type of network that is capable of transmitting data from a source device to a destination device.

Further, various functions are described below as being performed by particular components in network 100. In other implementations, various functions described below as being performed by one device may be performed by another device or multiple devices, and various functions described as being performed by multiple devices may be combined and performed by a single device.

Figure 2:
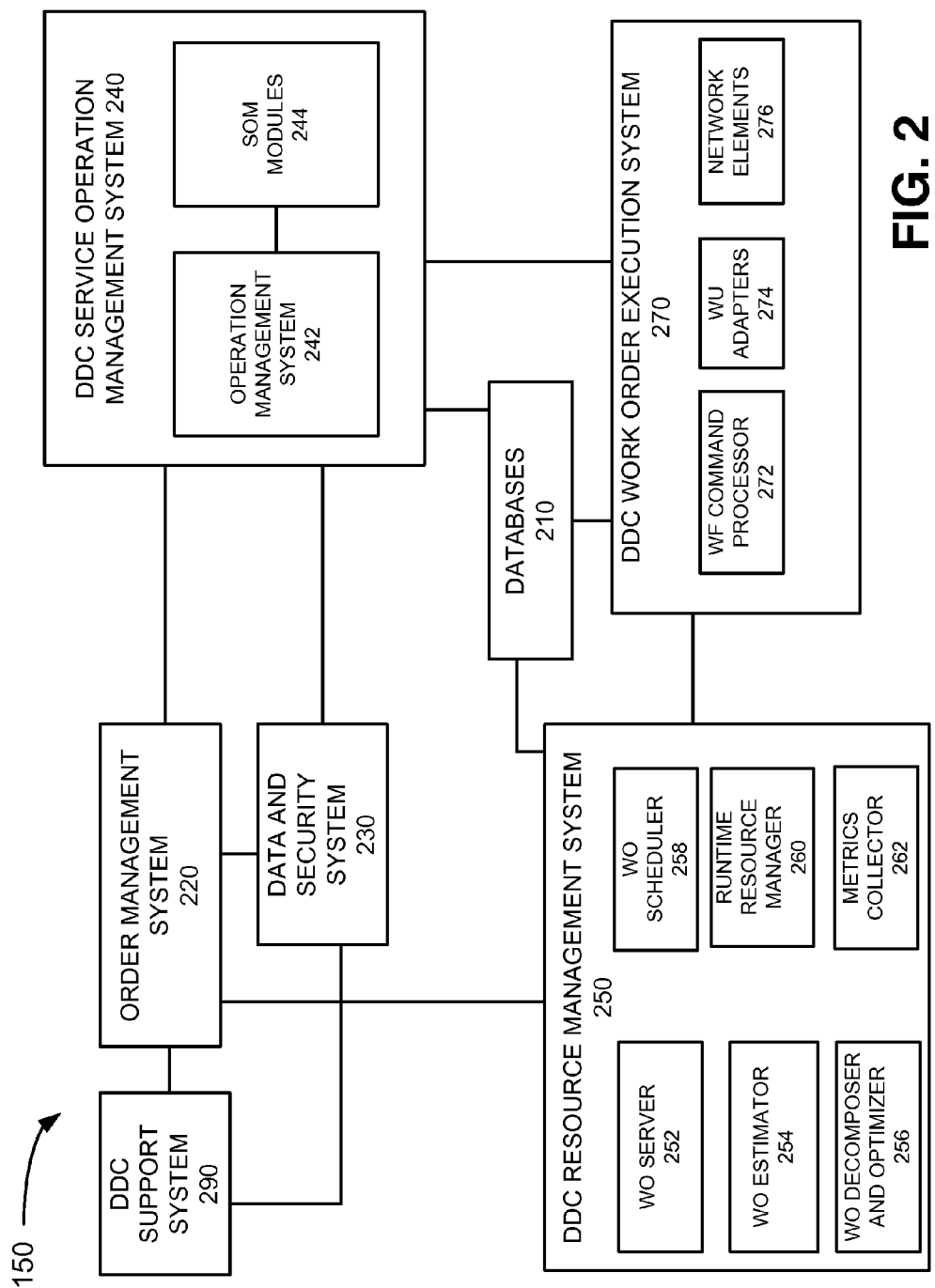
FIG. 2 illustrates an exemplary architecture associated with one of the components of FIG. 1.

FIG. 2 illustrates an exemplary configuration of a portion of DDC 150. Referring to FIG. 2, DDC 150 may include databases 210, order management system 220, data and security system 230, DDC service operation management (SOM) system 240, DDC resource management system 250, DDC work order execution (WOE) system 270 and DDC support system 290.

Databases 210 may store work unit definitions, workflows, parameters, tables that are associated with various components in DDC 150, intermediate or end results of processing performed by different processes in DDC 150, etc. The term "work unit," as used herein, may refer to a description of a set of one or more operations that a system may perform on content (e.g., overlaying subtitles on a video, inserting advertisements into a video, reformatting a video, etc.).

Order management system 220 may include one or more computing devices or servers for managing customer orders, generating reports, etc. In an exemplary implementation, order management system 220 may include client components that interface with components on DDC service operation management system 240. The client components (e.g., web browser) may receive customer orders, requests for reports, etc., and relay the received information to the components on DDC service operation management system 240 for the creation, validation, estimation, submission, approval, execution and reporting of activities associated with the customer orders, request for reports, etc. For example, a customer order may be completed by sending, to a component on DDC service operation management system 240, a selection of a particular workflow that will drive the processing of content associated with the order.

Data and security system 230 may include one or more computing devices or servers that provide for authentication and authorization of users having roles in DDC 150 and/or for taking actions that are associated with the authorized roles (e.g., create user accounts, remove user accounts, generate an initial password, etc.). For example, when a user logs in as a DDC operator, the user may be authorized to design work units and/or compose workflows. In an exemplary implementation, data and security system 230 may interface with order management system 220, DDC SOM system 240 and DDC support system 290.

DDC service operation management (SOM) system 240 may include one or more servers or computing devices to control the overall operation, configuration, and management of DDC 150. For example, DDC SOM system 240 may include operation management system 242 and SOM modules 244. Via a client component that communicates with operation management system 242, a user may control the configuration, administration and operation of DDC 150. For example, in one implementation, via a web browser or another client application, a user may control security, compose a workflow, administer accounts that are associated with content creator 110 or DMR 130, submit a work order, add data and storage to DDC 150, manage resources, manage DDC configuration (e.g., create a work unit), manage catalogs of content, run reports, monitor DDC work order (e.g., information associated with a work order), etc.

In providing each of such services to a client, operation management system 242 may employ SOM modules 244. SOM modules 244 may include components/modules that correspond to the above-listed services. For example, SOM modules 244 may include a security manager, workflow manager, account manager, work order manager, data and storage manager, resource management module, configuration manager, asset management module, catalog management module, monitoring and reporting module, etc. DDC SOM system 240 may further include an operational graphical user interface (GUI) for interfacing with SOM modules.

DDC resource management system 250 may include one or more servers or computing devices that support the capacity management of resources associated with network elements (NEs) in DDC 150. As illustrated in FIG. 2, DDC resource management system 250 may include work order (WO) server 252, WO estimator 254, WO decomposer and optimizer 256, WO scheduler 258, runtime resource manager 260 and metrics collector 262. Components 252-262 may aid in scheduling and allocating resources associated with fulfilling customer orders, as described in detail below. DDC resource management system 250 may also include a circuit design component to generate logical circuits or paths that will be used to fulfill customer orders, as described in detail below.

WO server 252 may provide work order-related interfaces to operation management system 242 and/or SOM modules 244, and may communicate with WO estimator 254, WO decomposer and optimizer 256, and WO scheduler 258 to submit, decompose, validate, and save work orders, and to estimate, schedule, and reserve resources during the order submission.

Work order estimator 254 may estimate the cost of completing a decomposed work order across work units of a workflow, based on resources that are associated with the work units for each resource type. Work order estimator 254 may store the cost in one of databases 210 in terms of resource capacity units (RCUs) and duration of time required to complete tasks or processes that are associated with the work order.

WO decomposer and optimizer 256 may break down an order into work units based on the workflow associated with the order. Furthermore, based on the decomposition, WO decomposer and optimizer 256 may generate work unit tasks, or simply "tasks," assign task parameters, and create task connectors, which are described below.

WO scheduler 258 may match cost estimates for different resource types for a work order to available time slots in an allocation schedule across different network elements (e.g., hardware/software components that perform underlying operations for a work unit). As a result of the scheduling, WO scheduler 258 may output start and end times for each of the work unit tasks and for resource reservations.

Runtime resource manager 260 may allocate network elements/user groups to a process at the time of execution on behalf of a work unit. Runtime resource manager 260 may attempt to honor scheduled reservations of resources. However, if the resources are unavailable, runtime resource manager 260 may attempt to obtain replacement resources.

Metrics collector 262 may determine, for each work unit, actual time of completion and used/consumed resources associated with the execution of the work unit. Based on previous actual execution measurements, metrics collector 262 may modify factors that are used to estimate the resource and time necessary to complete a task associated with a work unit for a particular asset.

In an exemplary implementation, resource management system 250 may represent the functions performed by various NEs used to execute work order tasks as resource types and represent the capacity of the NEs using resource capacity units (RCUs). The term "resource type," as used herein, may include categories of consumable network resources used to schedule, reserve, bill and manage network capacity. Examples of resource types include bandwidth, storage, the ability to transcode an asset from one format into another format. Resource types may also include resources associated with humans involved in the processing of assets, such as a human's ability to review a movie asset, etc. The term "RCU", as used herein, may include the unit of measure for a resource type. Examples of RCUs include megabits for bandwidth, gibabytes for storage, transcoding task units and/or CPU processing time for transcoding operations, etc.

DDC work order execution (WOE) system 270 may include one or more servers or computing devices to manage the flow and execution of work units of a defined workflow associated with a work order. DDC WOE system 270 may include a workflow (WF) command processor 272 (also referred to herein as command processor 272), work unit (WU) adapters 274, and network elements 276. For simplicity, FIG. 2 does not show other components of WOE system 270. Depending on the implementation, DDC WOE system 270 may include additional, fewer, or different components than those illustrated in FIG. 2. For example, WOE system 270 may include a work unit processor (not shown).

Command processor 272 may drive work order execution. Command processor 272 may include a WO manager and WO processor. The WO manager may provide interfaces to resource management system 250 for initiating an execution of a work order, retrieving the status of the work order, suspending/resuming the work order execution, canceling the work order, etc. The WO processor may coordinate work unit tasks for completion of a work order. In coordinating different work unit tasks, the WO processor may sequence the tasks for optimum execution time and resource utilization. The WO processor may communicate with runtime resource manager 260 for allocation and de-allocation of resources. The work unit processor may dispatch processes/threads to perform a work unit task.

Work unit adapter 274 may include interfaces for adapting network elements to perform media content processing corresponding to a work unit. In one implementation, each work unit adapter 274 may be versioned and may include Java code. Each work unit adapter 274 may monitor the corresponding network element to prevent over-allocation of the network element, maintain normal execution of logic associated with the network element, and provide real-time information to metrics collector 262.

Network elements 276 may include physical or logical network devices/components for processing media content.

DDC support system 290 may include one or more servers or computing devices and/or personnel to provide support services, such as creation of work units, composition of workflows, etc., billing support, contracting management, pricing, etc.

The configuration shown in FIG. 2 is for illustrative purposes. In other configurations and/or implementations, functions that are associated with one component or system shown in FIG. 2 may be performed by one or more other components in FIG. 2, any of the components may be connected to any other of the components, and functions of one component may be included in another component. Accordingly, in the other configurations or implementations, DDC 150 may include additional, fewer, different, or a different arrangement of components than those illustrated in FIG. 2.

Figure 3:
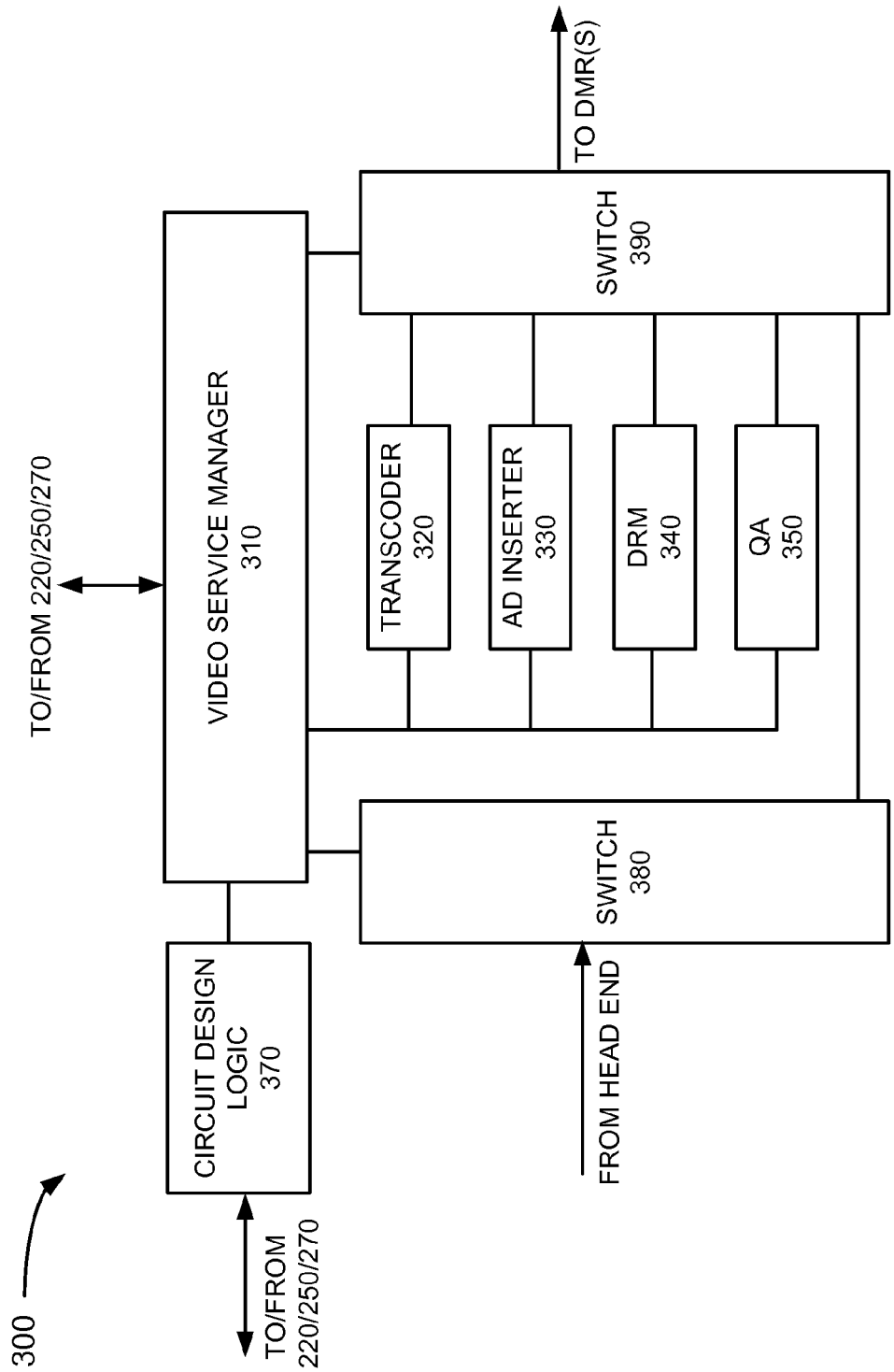
FIG. 3 illustrates an exemplary configuration of a video service management system in which methods and systems described herein may be implemented.

As described above, DDC 150 may provide an automated environment in which content from content creators 110 is transformed and packaged for distribution in any number of formats, based on the particular requirements associated with DMRs 130, consumers 140 and/or other devices, systems, etc. FIG. 3 illustrates an exemplary configuration of a video service management system 300 of DDC 150 which controls the activation and de-activation of data streams (e.g., live streams or linear streams) through various network elements, such as ad splicers, transcoders, encryptors, etc., and outputs a stream in a desired format to, for example, DMR 130 or a media delivery fabric or switch.

Referring to FIG. 3, video service management system 300 includes video service manager 310, transcoder 320, ad inserter 330, digital rights management (DRM) module 340, quality assurance (QA) module 350, circuit design logic 370, switch 380 and switch 390. The components shown in FIG. 3 are provided for simplicity. It should be understood that video service management system 300 may include additional and/or different elements than those illustrated in FIG. 3.

Video service manager (VSM) 310 provides instructions to network elements (NEs) responsible for processing a particular order. For example, VSM 310 may provide instructions to transcoder 320, ad inserter 330, DRM module 340 and QA module 350. In an exemplary implementation, VSM 310 interfaces directly with the relevant NEs by invoking the appropriate application programming interfaces (APIs). In cases where the API is not published, VSM 310 may rely on other components in DDC 150 to convert calls from VSM 310 to a proprietary standard that the NE can understand. In addition, in cases where a human intervention/processing is required with respect to an order, VSM 310 may create a human task that may be needed to complete the order.

VSM 310 also interfaces with switches 380 and 390 to create stream routing paths. For example, VSM 310 may create a stream routing path between ad inserter 330 and transcoder 320 via switch 390. The routing path may be used when ad inserter 330 needs to insert advertisements in a transcoded media file.

Transcoder 320 may be a network element associated with transcoding a media file from one format into another format based on order requirements. For example, transcoder 320 may support adaptive streaming with multiple bit rates and various packaging/chunking formats, such as Flash, HTTP live streaming (HLS), Silverlight, etc.

Ad inserter 330 may be a network element associated with splicing ads into a media file or media stream. For example, a media file/stream may include insertion points for inserting advertisements. Ad inserter 330 may include logic for inserting particular ads at the ad insertion points. The inserted ads may be selected based on geographical location, a subscriber profile or other information.

DRM module 340 may be a network element associated with ensuring that digital rights management associated with digital use licenses for a media file are clearly documented for DMRs 130. For example, DDC 150, via DRM module 340, may issue digital use licenses to consumers within timeframes agreed upon with the content providers 110 and DMRs 130 that will distribute the content.

QA module 350 may represent a network element that performs quality assurance on a transcoded media file prior to forwarding the media file to a DMR 130 via switch 390. For example, QA module 350 may ensure that the file is encoded in the correct format, encrypted (if necessary), etc., before the file is forwarded to switch 390. QA module 350 may also package the content for delivery to end users.

Circuit design logic 370 may be a sub-component of resource management system 250 or may be located externally from resource management system 250. In either case, circuit design logic 370 identifies NEs and other elements (e.g., human elements) to fulfill a customer order for live and/or linear streaming of content. Circuit design logic 370 may utilize a list of all NEs and device types used to support live/linear streaming in DDC 150. For example, circuit design logic 370 and/or resource management system 250 may include a memory storing a list of all NEs and their corresponding functions. In an exemplary implementation, circuit design logic 370 may also assign various NEs to "logical functional zones." For example, each functional zone may be a collection of NEs responsible for performing a specific function in the order process (e.g., transcoding, ad splicing, encrypting, etc.).

Circuit design logic 370 may design logical connections between various NEs across functional zones to create live/linear streams in accordance with formats/requirements specified in the customer order. For example, circuit design logic 370 may design connections between a source feed from a head end (e.g., satellite network or other network that distributes content from content creators 110 or other entities to DDC 150, also referred to herein as a super head end) to the functional zones responsible for transcoding the content, splicing ads into the content and packaging the content for delivery, as described in more detail below.

Switch 380 may receive information from a head end associated with DDC 150. For example, switch 380 may receive content from a network (e.g., a satellite network, a wired network) and forward the content to components of DDC 150 for further processing.

Switch 390 may be associated with forwarding packaged content to end users, such as DMRs 130. For example, switch 390 may forward content associated with customer orders to DMRs 130, who may provide the packaged/transformed content to consumers 140, as described in detail below.

The components of video service management system 300 illustrated in FIG. 3 interact with other components of DDC 150, such as order management system 220, resource management system 250, DDC work order execution system 270, etc., to control the processing of customer orders and the activation and de-activation of data streams, as described in detail below.

Figure 4:
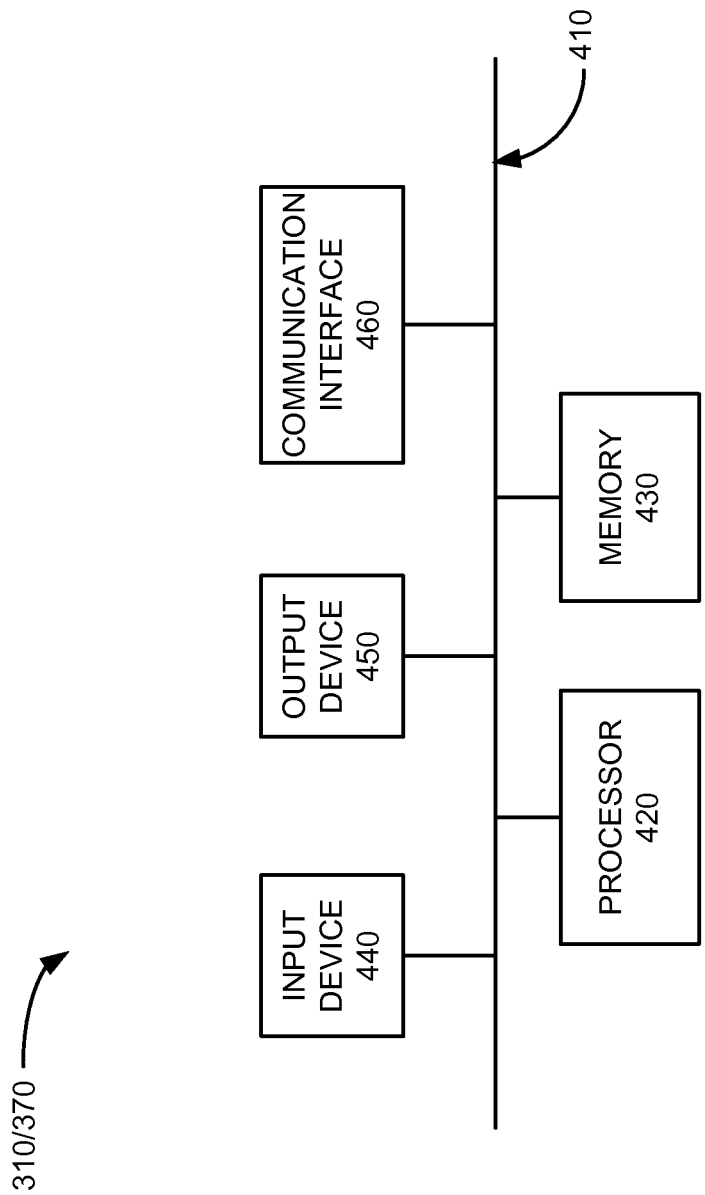
FIG. 4 illustrates an exemplary configuration of one or more of the components of FIG. 3.

FIG. 4 illustrates an exemplary configuration of one or more components of video service management system 300 illustrated in FIG. 3. For example, one or more of VSM 310, circuit design logic 370, the NEs (e.g., transcoder 320, ad inserter 330, DRM module 340, QA module 350), switch 380 and switch 390 may be implemented via one or more devices configured as illustrated in FIG. 4. Other components in system 100 (FIG. 1), such as components in DDC 150 (e.g., order management system 220, data and security system 230, DDC SOM system 240, DDC resource management system 250, DDC work order execution system 270 and DDC support system 290) may be configured in a similar manner.

Referring to FIG. 4, video service manager 310 (or any of the other components illustrated in FIG. 3) may include bus 410, processor 420, memory 430, input device 440, output device 450 and communication interface 460. Bus 410 may include a path that permits communication among the elements of video service manager 310.

Processor 420 may include one or more processors, microprocessors, or processing logic that may interpret and execute instructions. Memory 430 may include a random access memory (RAM) or another type of dynamic storage device that may store information and instructions for execution by processor 420. Memory 430 may also include a read only memory (ROM) device or another type of static storage device that may store static information and instructions for use by processor 420. Memory 430 may further include a solid state drive (SDD). Memory 430 may also include a magnetic and/or optical recording medium (e.g., a hard disk) and its corresponding drive.

Input device 440 may include a mechanism that permits a user to input information, such as a keyboard, a keypad, a mouse, a pen, a microphone, a touch screen, voice recognition and/or biometric mechanisms, etc. Output device 450 may include a mechanism that outputs information to the user, including a display, a printer, a speaker, etc.

Communication interface 460 may include a transceiver for communicating with other devices within DDC 150 via wired, wireless or optical mechanisms. Communication interface 460 may also include one or more radio frequency (RF) transmitters, receivers and/or transceivers and one or more antennas for transmitting and receiving RF data via, for example, network 100. Communication interface 460 may also include a modem or an Ethernet interface to a LAN or other mechanisms for communicating with elements in a network or system, such as network 100 or another network/system.

The exemplary configuration illustrated in FIG. 4 is provided for simplicity. It should be understood that devices in video service manager 310 (or any of the other components illustrated in FIG. 3) may include more or fewer devices than illustrated in FIG. 4. In an exemplary implementation, one or more components of video service manager 310 may perform operations in response to processor 420 executing sequences of instructions contained in a computer-readable medium, such as memory 430. A computer-readable medium may be defined as a physical or logical memory device. The software instructions may be read into memory 430 from another computer-readable medium (e.g., a hard disk drive (HDD), SSD, etc.), or from another device via communication interface 460. Alternatively, hard-wired circuitry may be used in place of or in combination with software instructions to implement processes consistent with the implementations described herein. Thus, implementations described herein are not limited to any specific combination of hardware circuitry and software.

Figure 5:
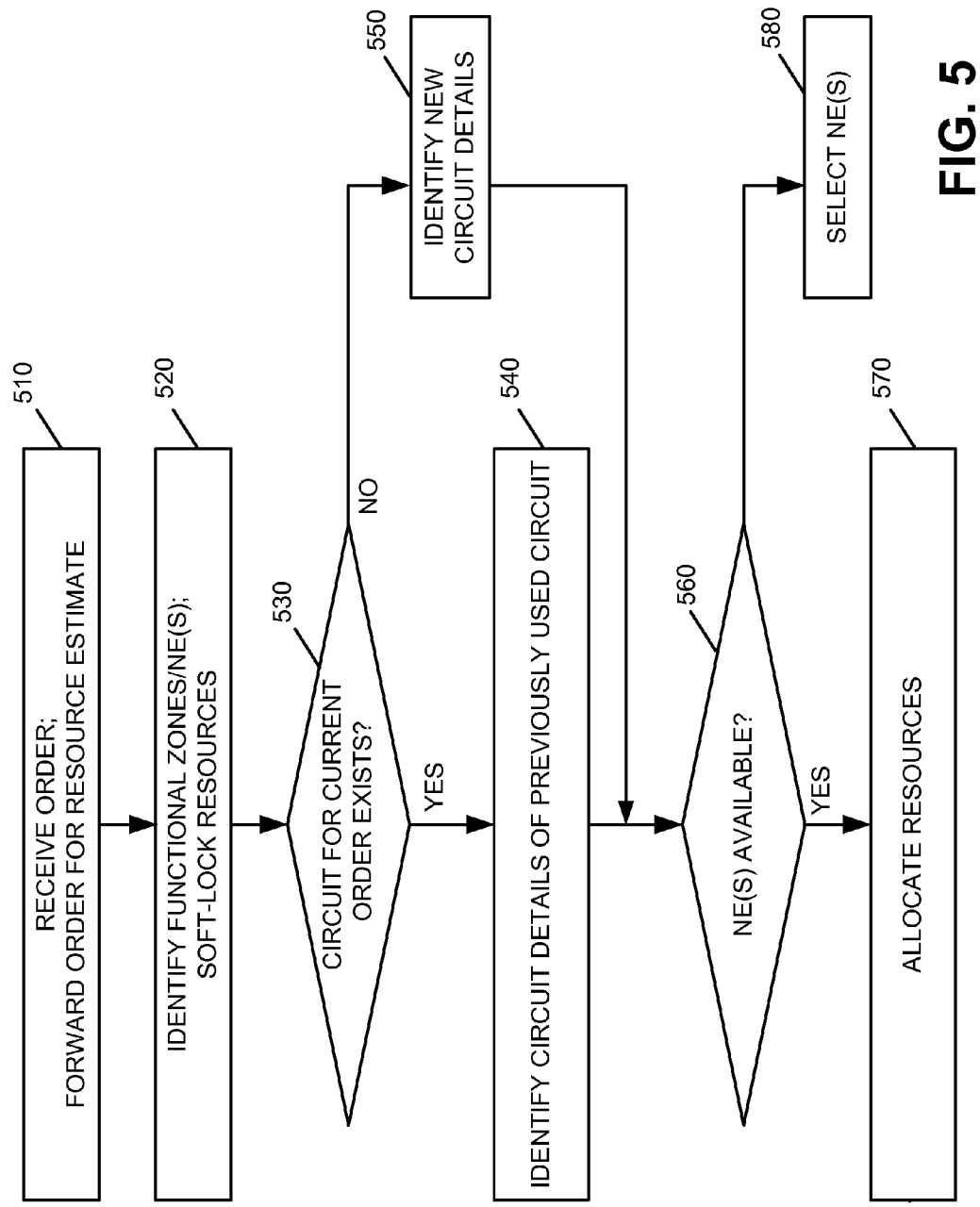
FIG. 5 is a flow diagram illustrating exemplary processing associated with the video service management system of FIG. 3.
Figure 6A:
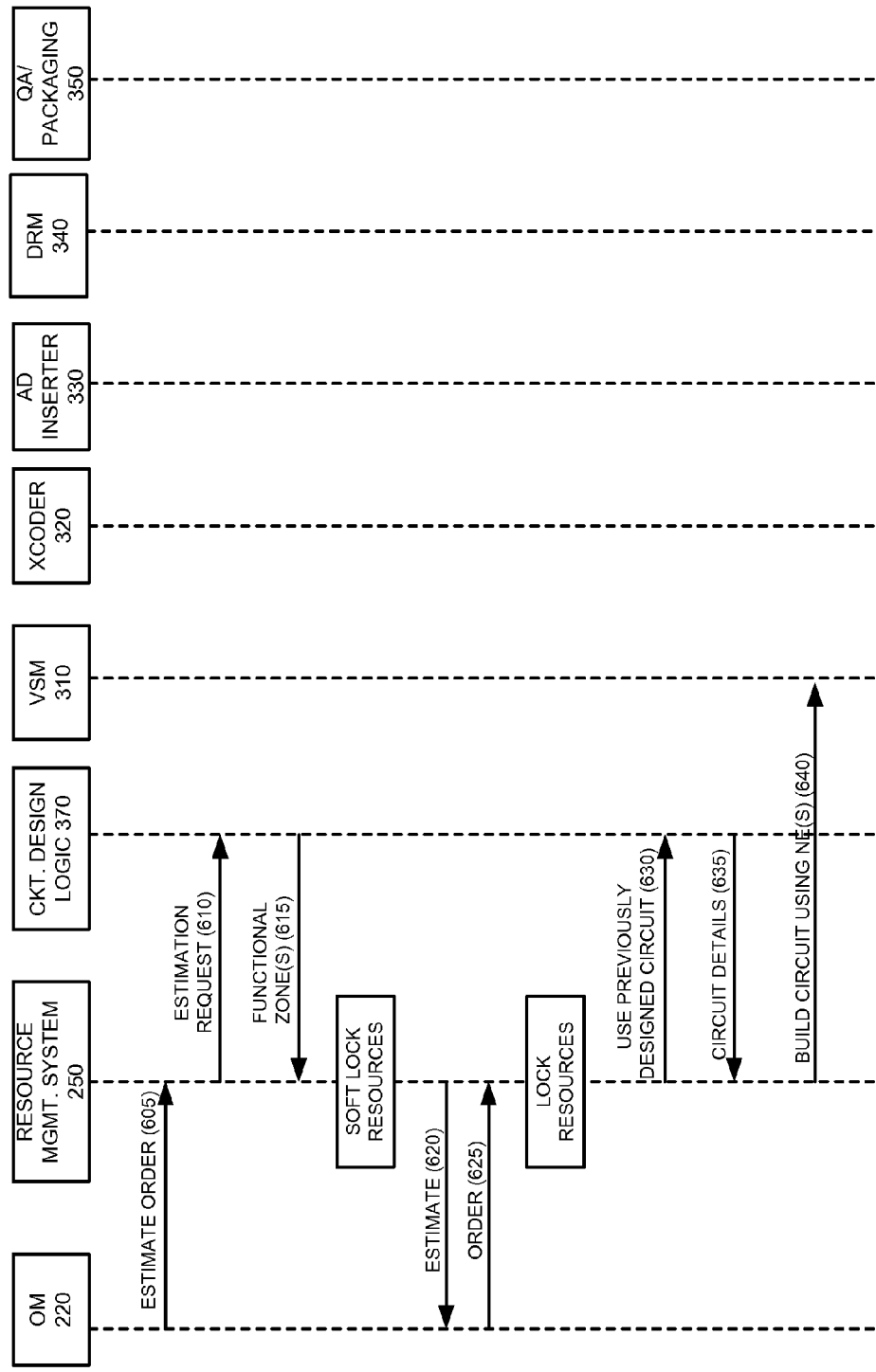
FIGS. 6A and 6B are signal flow diagrams associated with the processing of FIG. 5.
Figure 6B:
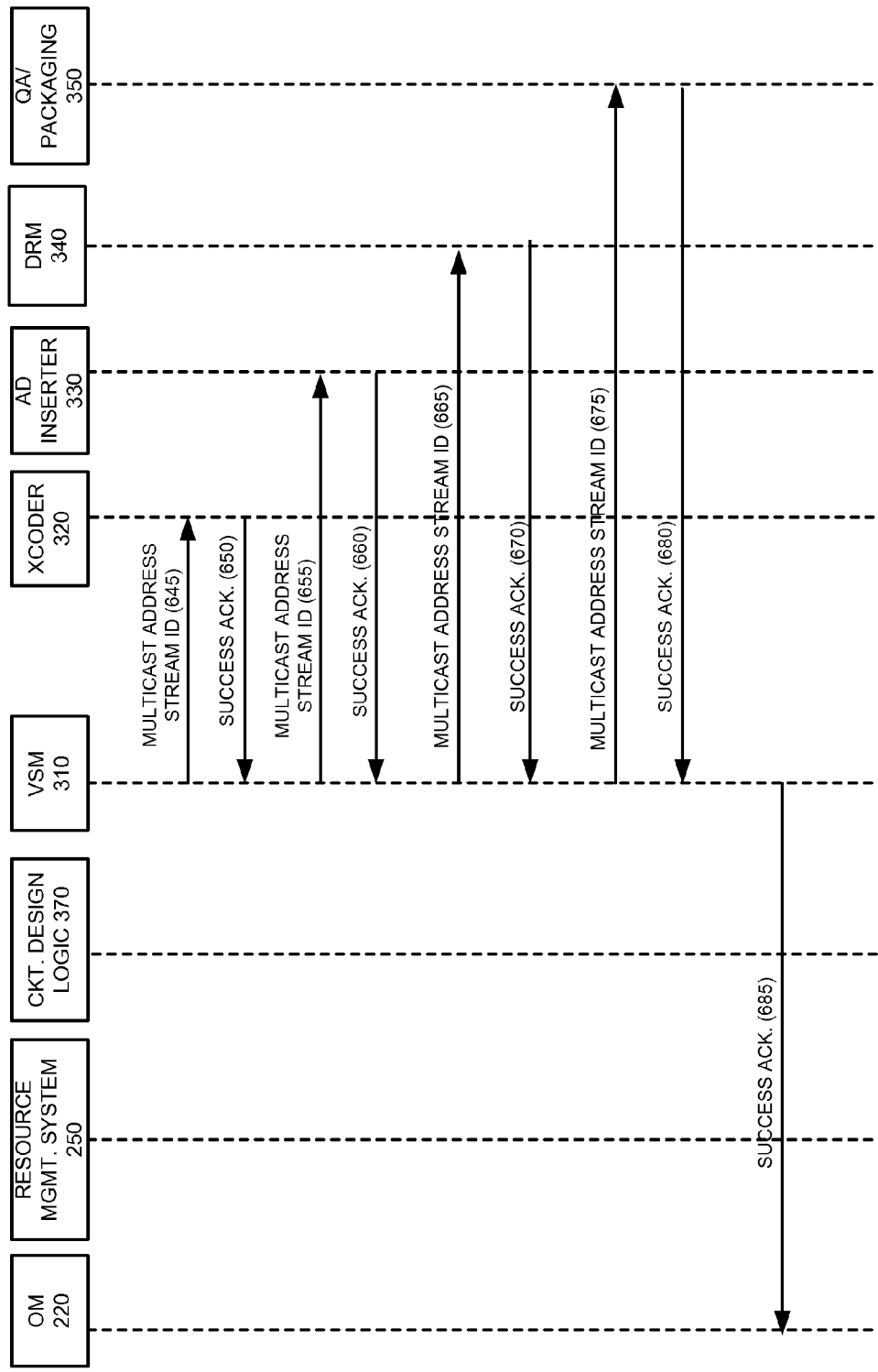

FIG. 5 is an exemplary flow diagram illustrating processing associated with video service management system 300 and FIGS. 6A and 6B are exemplary signal flow diagrams associated with the processing in FIG. 5. The processing of FIG. 5 will be described in connection with the signal flow diagrams of FIGS. 6A and 6B. Processing may begin with order management system 220 processing an order and forwarding a request to resource management system 250 for a resource estimate associated with fulfilling the order (FIG. 5, block 510; FIG. 6A, 605). For example, assume that the order/request is associated with a customer request to play a live stream in an MPEG-4 format.

Resource management system 250 may receive the request and forward the request to circuit design logic 370 (610). Circuit design logic 370 may design a logical connection between the source feed (e.g., from the head end/super head end) to the functional zone responsible for processing the order. For example, the order may include transcoding the content to MPEG-4 format, splicing ads into the content and packaging the content with the appropriate DRM licenses for distribution. In this case, circuit design logic 370 may design a logical connection that connects the source feed associated with the content to a functional zone associated with transcoding to MPEG-4, connects the output stream from the transcoder NE to an ad splicing functional zone, and connects the output of the ad splicing NE to the functional zone responsible for packing the content for delivery. The logical connections between the functional zones/NEs are referred to herein as a "circuit" and/or logic/logical circuit. In addition, the term "connection points" (CPs) will be used to describe the logical connections that circuit design logic 370 establishes between various NEs in the functional zones.

Circuit design logic 370 may forward information to resource management system 250 identifying the functional zones needed for the order (block 520; FIG. 6A, 615). Resource management system 250 may receive the functional zone information and "soft lock" the resources (block 520). For example, resource management system 250 may temporarily reserve the resources needed to fulfill the order. Resource management system 250 may also provide the estimate to order management system 220 (620).

Order management system 220 may receive the order estimate and determine whether to place the order. For example, if order management system 220 determines that the "cost" associated with the estimate is too high or the order cannot be processed in the desired time frame, order management system 220 may signal a customer associated with the order that the order cannot be fulfilled based on the customer's preferred parameters. In this example, assume that the order can be fulfilled. Order management system 220 forwards the order to resource management system 250 (625). Resource management system 250 receives the order and locks the resources needed to fulfill the order.

Resource management system 250 and circuit design logic 370 may prioritize the usage of the most efficient NEs for the logical circuit that will be used to fulfill the order. For example, resource management system 250 may forward information to circuit design logic 370 inquiring whether a previously designed/existing circuit may be used for the current order (block 530; FIG. 6A, 630). Continuing with the example above, if a circuit exists that connects the source file to an ad splicer, connects the output from the ad splicer to a transcoder capable of transcoding the content to MPEG-4, and connects output from the transcoder to an encryptor for encrypting and delivering the processed content to the DMR, circuit design logic 370 may return information identifying circuit details of the previously used circuit (block 540; FIG. 6A, 635).

If circuit design logic 370 is not able to identify a previously used/existing circuit that can be used for the current order (block 530—no), circuit design logic 370 may generate a new circuit to fulfill the order and forward the circuit details to resource management system 250 (block 550; FIG. 6A, 635). For example, circuit design logic 370 may identify and prioritize the usage of the most efficient functional zones/NEs for a logical circuit that will fulfill the order.

In either case, resource management system 250 receives the logical circuit design and determines whether the circuit/NEs identified by circuit design logic 370 are available when allocating resources (block 560). If the resources are available, resource management system 250 may utilize the available resources for fulfilling the order (block 570). For example, resource management system 250 may forward information identifying the NEs to VSM 310 (640). If, however, the resources/NEs are not available (bock 560—no), resource management system 250 may utilize the best available NEs to fulfill the customer order (block 580). In this case, circuit design logic 370 may update its circuit design based on the NEs actually selected by resource management system 250.

After the circuit is designed/selected, VSM 310 may connect with the functional zones/NEs to fulfill the order. For example, VSM 310 may communicate with transcoder 320 via a multicast address assigned to a functional zone associated with transcoders identified in the logical circuit that can perform the desired transcoding (e.g., MPEG-4 transcoding in this example) (FIG. 6B, 645). The communication to transcoder 320 may also include a stream ID that allows the transcoder 320 to identify the appropriate media stream. In an exemplary implementation, VSM 310 may also ensure that the selected transcoder 320 is set up with the proper configuration prior to forwarding the stream ID to the selected transcoder 320. In some instances, if the selected transcoder 320 is not set up with the proper configuration, VSM 310 may communicate with the transcoder 320 to provide the proper configuration. After the transcoding is complete, transcoder 320 may send a successful acknowledgement to VSM 310 (650).

VSM 310 may communicate with ad inserter 330 via a multicast address associated with the functional zone identified in the logical circuit and provide a stream ID for the partially processed stream that allows ad inserter 330 to identify the appropriate stream in which ads will be inserted (655). Similar to the description above with respect to the selected transcoder/NE 320, VSM 310 may also ensure that the selected ad inserter 330 is set up with the proper configuration prior to forwarding the stream ID to the selected ad inserter 330. In some instances, if the selected ad inserter 330 is not set up with the proper configuration (e.g., ad inserter 330 is not set up with the proper geographic information needed to insert local ads), VSM 310 may communicate with ad inserter 330 to provide the proper configuration. After ad inserter 330 inserts the desired ads, ad inserter 330 may send a signal/communication to VSM 310 indicating that the ads were successfully inserted (660).

VSM 310 may then communicate with the next functional zone/NE identified in the logical circuit. For example, VSM 310 may communicate with DRM module 340 via a multicast address identified in the logical circuit and send a stream ID identifying the appropriate stream (665). If the selected DRM module 340 is not set up with the proper configuration (e.g., based on DRM requirements associated with the DMR for which the order is being processed), VSM 310 may communicate with DRM module 340 to provide the proper configuration. After DRM module 340 inserts or appends the appropriate use/license information to the stream, DRM module 340 may send a signal/communication to VSM 310 indicating that the use/license information was successfully inserted (670).

VSM 310 may then communicate with the next functional zone/NE identified in the logical circuit. For example, VSM 310 may communicate with QA/packaging module 350 via a multicast address identified in the logical circuit and send a stream ID identifying the appropriate stream (675). If the selected QA/packaging module 350 is not set up with the proper configuration (e.g., based on requirements associated with the DMR for which the order is being processed), VSM 310 may communicate with QA/packaging module 350 to provide the proper configuration. After QA/packaging module 350 performs quality assurance checks and/or performs various packaging associated with the order, QA/packaging module 350 may send a signal/communication to VSM 310 indicating that file/stream was successfully processed (680). VSM 310 may then forward a success acknowledgement to order management system 220 (685). In this manner, video service management system 300 may facilitate efficient processing of media files, including live media streams, in accordance with customer orders.

Figure 7:
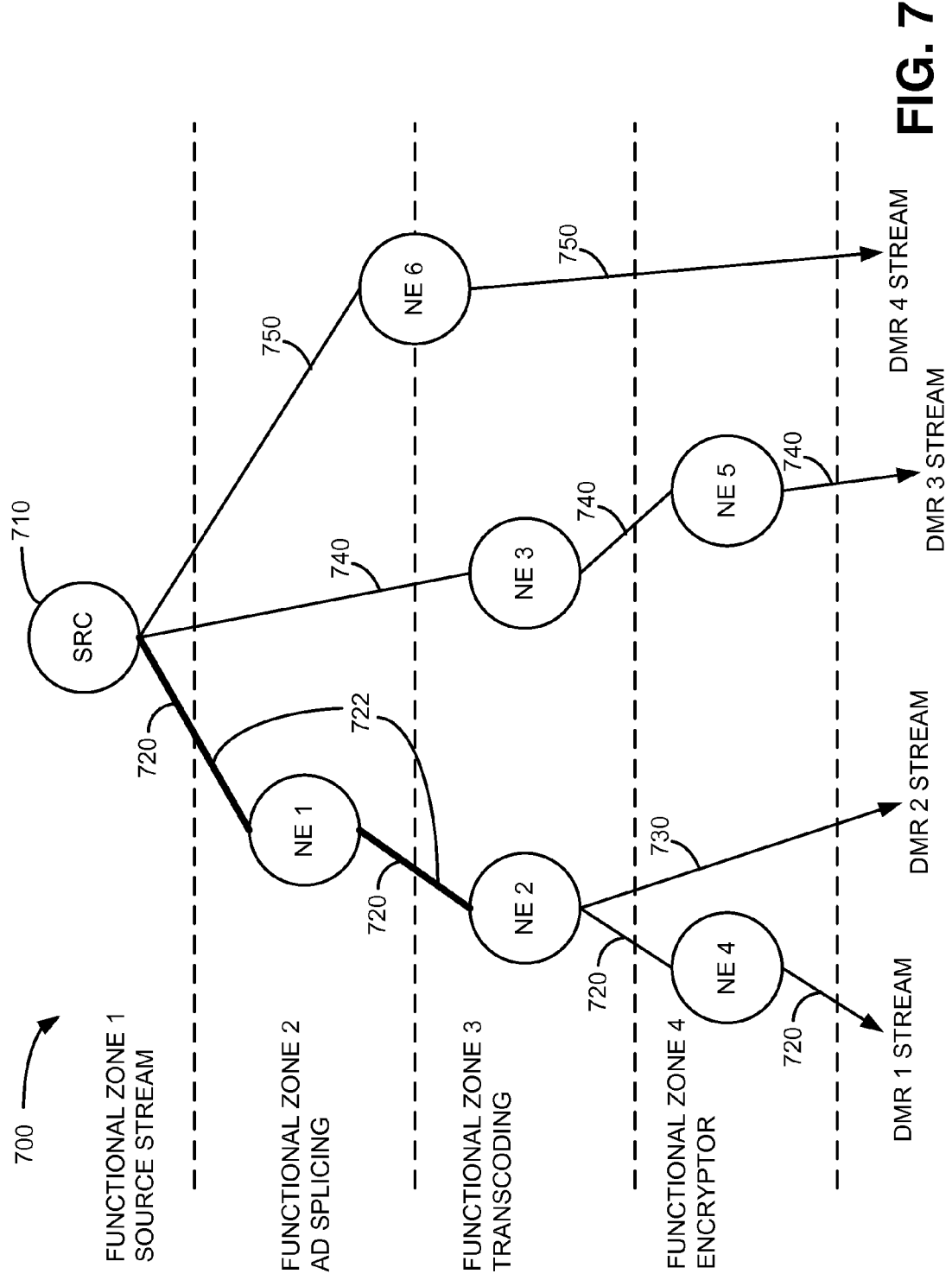
FIG. 7 is a block diagram illustrating exemplary logical circuits generated by one or more of the components of FIG. 3.

As described above, circuit design logic 370 utilizes functional zones to generate circuits for executing orders. FIG. 7 illustrates a hierarchical graphical representation of a number of logic circuits and re-use of an existing circuit to process orders to different DMRs 130, labeled DMR 1, DMR 2, DMR 3 and DMR 4. Referring to FIG. 7, representation 700 includes a source 710 and NEs 1-6. Representation 700 also illustrates a number of functional zones associated with performing various functions. For example, functional zone 1 corresponds to the source stream, functional zone 2 corresponds to ad splicing, functional zone 3 corresponds to transcoding and functional zone 4 corresponds to encrypting.

In this example, assume that an order associated with DMR 1 requires ad splicing, transcoding and encrypting of the source file 710. In this case, logical circuit 720 includes source file 710 connected to NE 1 in functional zone 2, NE 1 connected to NE 2 in functional zone 3, NE 2 connected to NE 4 in functional zone 4, and NE 4 sending the stream to DMR 1, as illustrated by the lines labeled 720 in FIG. 7.

Assume that a second order involves source file 710, ad splicing and MPEG-4 transcoding, but no encrypting. As illustrated in FIG. 7, circuit design logic 370 may generate or design a circuit 730 that re-uses the portion of existing circuit 720 labeled 722 and shown in bold in FIG. 7. Circuit design logic 370 may forward the output from NE 2 in functional zone 3 to DMR 2, as illustrated in FIG. 7.

Representation 700 illustrates logic circuits 740 and 750. More particularly, logic circuit 740 includes SRC 710 in functional zone 1 connected to NE 3 in functional zone 3 and NE 5 in functional zone 4. The output from NE 5 may be forwarded to DMR 3. Logic circuit 750 includes SRC 710 in functional zone 1 connected to NE 6 that spans functional zones 2 and 3. As illustrated, NE 6 is shown being located across functional zone 2 and functional zone 3. In this case, NE 6 performs functions associated with both functional zones 2 and 3 (i.e., ad splicing and transcoding). The output of NE 6 may for forwarded to DMR 4.

In this manner, a hierarchical structure generated by circuit design logic 370 may help eliminate creation of duplicate streams when servicing orders having similar requirements for multiple DMRs 130 and/or other end users. In situations, when a live or linear stream circuit is no longer being used to service streams or files, circuit design logic 370 may purge that circuit. As a result, the use of the NEs in the functional zones may be rebalanced to provide optimal network element usage within DDC 150. That is, the NEs associated with the circuits being purged will be available to service other orders.

Implementations described herein provide an infrastructure for processing media from a head end through various network elements. The infrastructure may dynamically evaluate the customer's request, generate processing paths or circuits through the network elements and determine if any existing paths may be re-used. This allows the infrastructure to efficiently process customer orders.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to components of video service management system 300 performing various tasks to process requests and facilitate execution of customer orders. In other implementations, other components, systems, platforms, etc., in, for example, DDC 150 may perform some or all of these tasks. In addition, in some implementations, network 100 may include multiple video service management systems 300 and/or DDCs 150.

Further, while series of acts have been described with respect to FIG. 5 and series of signal flows have been described with respect to FIGS. 6A and 6B, the order of the acts and/or signal flows may be varied in other implementations. Moreover, non-dependent acts or signal flows may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessors, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
receiving a first order associated with processing a media file;
estimating resources associated with fulfilling the first order;
generating a first logical circuit representing a plurality of network elements to fulfill the first order and connections between the plurality of network elements, wherein the plurality of network elements include at least two of a transcoder, an advertisement inserter, an encryptor or a quality assurance module, and wherein the generating a first logical circuit comprises:
    accessing information identifying a plurality of existing logical circuits used to process other orders for processing media files, wherein each of the existing logical circuits identifies network elements and connections between the network elements,
    determining whether an existing logical circuit can be used to process at least some of the first order, and
    using the existing logical circuit as at least part of the first logical circuit, in response to determining that the existing logical circuit can be used to process at least some of the first order;
assigning a second plurality of network elements corresponding to a particular task to a functional zone, wherein the functional zone has a multicast address associated with performing the particular task, and wherein the generating a first logical circuit further comprises:
    identifying a plurality of functional zones needed to fulfill the first order, wherein the plurality of functional zones comprise a transcoding functional zone, an ad splicing functional zone and an encrypting functional zone;
allocating resources based on the first logical circuit; and
executing the first order using the allocated resources.

2. The computer-implemented method of claim 1, further comprising:
determining whether the plurality of network elements associated with the first logical circuit are available to fulfill the first order.

3. The computer-implemented method of claim 2, further comprising:
identifying alternative network elements, in response to determining that the plurality of network elements associated with the first logical circuit are not available to fulfill the first order; and
updating the first logical circuit based on the identified alternative network elements.

4. The computer-implemented method of claim 1, wherein the generating a first logical circuit further comprises:
identifying a network element in each of the plurality of functional zones, and
identifying connections between the network elements in each of the plurality of functional zones.

5. The computer-implemented method of claim 1, wherein the media file is associated with streaming multi-media content, the method further comprising:
receiving the multi-media content via a head end; and
streaming the multi-media content after the first order is executed to a digital media retailer or to a consumer associated with the first order.

6. The computer-implemented method of claim 5, wherein the multi-media content corresponds to a live event.

7. The computer-implemented method of claim 1, wherein the plurality of network elements comprises a transcoder and an encryptor.

8. The computer-implemented method of claim 1, wherein the plurality of network elements comprises a transcoder and an advertisement inserter.

9. The computer-implemented method of claim 1, wherein the plurality of network elements comprises a transcoder, an encryptor and an advertisement inserter.

10. A system, comprising:
a memory configured to store information identifying a plurality of network elements and functions performed by the network elements to fulfill orders; and
at least one processing device configured to:
receive a first order associated with processing media,
estimate resources associated with fulfilling the first order,
generate a first circuit representing network elements to fulfill the first order and connections between the network elements, wherein when generating a first circuit, the at least one processing device is configured to:
access information identifying a plurality of existing circuits used to process other orders,
determine whether an existing circuit can be used to process at least some of the first order, and
use the existing circuit as at least part of the first circuit, in response to determining that the existing circuit can be used to process at least some of the first order,
assign a second plurality of network elements corresponding to a particular task to a functional zone, wherein the functional zone has a multicast address associated with performing the particular task,
wherein when generating the first circuit, the at least one processing device is further configured to:
identify a plurality of functional zones needed to fulfill the first order, wherein the plurality of functional zones comprise a transcoding functional zone, an ad splicing functional zone and an encrypting functional zone,
allocate resources based on the first circuit, and
execute the first order using the allocated resources.

11. The system of claim 10, wherein the at least one processing device is further configured to:
determine whether the network elements associated with the first circuit are available to fulfill the first order.

12. The system of claim 11, wherein the at least one processing device is further configured to:
identify alternative network elements, in response to determining that the network elements associated with the first circuit are not available to fulfill the first order, and
update the first circuit based on the identified alternative network elements.

13. The system of claim 10, wherein when generating the first circuit, the at least one processing device is configured to:
identify a network element in each of the plurality of functional zones, and
identify connections between the network elements in each of the plurality of functional zones.

14. The system of claim 10, wherein the media is associated with a live event.

15. The system of claim 10, wherein the plurality of network elements include at least two of a transcoder, an advertisement inserter, an encryptor or a quality assurance module.

16. The system of claim 10, further comprising:
the plurality of network elements, wherein the plurality of network elements include at least two of a transcoder, an advertisement inserter, an encryptor or a quality assurance module.

17. A method, comprising:
receiving a first order associated with processing a media file or stream;
estimating resources needed to fulfill the first order;
generating a first circuit or path representing a plurality of network elements to fulfill the first order and connections between the plurality of network elements, wherein the generating a first circuit or path comprises:
accessing information identifying a plurality of existing circuits or paths used to process other orders,
determining whether an existing circuit or path can be used to process at least some of the first order, and
using the existing circuit or path as at least part of the first circuit or path, in response to determining that the existing circuit or path can be used to process at least some of the first order;
assigning a second plurality of network elements corresponding to a particular task to a functional zone;
wherein the generating the first circuit or path further comprises:
identifying a plurality of functional zones needed to fulfill the first order, wherein the plurality of functional zones comprise a transcoding functional zone, an ad splicing functional zone and an encrypting functional zone;
determining whether the plurality of network elements associated with the first circuit or path are available to fulfill the first order;

allocating resources based on the first circuit or path, in response to determining that the network elements associated with the first circuit or path are available to fulfill the first order;

communicating with the allocated resources to ensure that the allocated resources are configured properly to fulfill tasks associated with the first order; and executing the first order using the allocated resources.

18. The method of claim 17, wherein the using the existing circuit or path comprises:

using a portion of the existing circuit or path to process some of the first order.

19. The method of claim 17, wherein the plurality of network elements include at least two of a transcoder, an advertisement inserter, an encryptor or a quality assurance module.

20. The method of claim 17, wherein the plurality of network elements include at a transcoder, an advertisement inserter and an encryptor.

\* \* \* \* \*